(12) United States Patent
Khan et al.

(10) Patent No.: US 9,751,027 B2
(45) Date of Patent: Sep. 5, 2017

(54) INTERFACE AND MUD CONTROL SYSTEM AND METHOD FOR REFINERY DESALTERS

(71) Applicant: Cameron International Corporation, Houston, TX (US)

(72) Inventors: Rafiqul Khan, Cypress, TX (US); Joseph Min-Hsiun Lee, Houston, TX (US); Gary W. Sams, Spring, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/047,361

(22) Filed: Feb. 18, 2016

(65) Prior Publication Data

US 2016/0158669 A1 Jun. 9, 2016

Related U.S. Application Data

(60) Continuation-in-part of application No. 14/138,390, filed on Dec. 23, 2013, which is a division of (Continued)

(51) Int. Cl.
*B01D 17/00* (2006.01)
*C10G 31/00* (2006.01)
(Continued)

(52) U.S. Cl.
CPC ......... *B01D 17/04* (2013.01); *B01D 17/0214* (2013.01); *B01D 17/12* (2013.01); *B01D 19/0036* (2013.01); *B01D 21/0042* (2013.01); *B01D 21/0087* (2013.01); *B01D 21/10* (2013.01); *B01D 21/2416* (2013.01); *B01D 21/2472* (2013.01); *B01J 4/004* (2013.01); *B08B 9/0933* (2013.01); *C10G 31/08* (2013.01); *C10G 33/06* (2013.01); (Continued)

(58) Field of Classification Search
CPC .......... E21B 43/34; B01D 17/04; C10G 31/08
USPC .............................................. 366/173.2; 95/53
See application file for complete search history.

(56) References Cited

U.S. PATENT DOCUMENTS 2,765,917 A * 10/1956 Francis, Jr. ............ C10G 33/06
95/253
3,396,100 A 8/1968 Pettefer
(Continued)

FOREIGN PATENT DOCUMENTS

EP 0162968 A1 12/1985

OTHER PUBLICATIONS

Definition of the word "Lance".

*Primary Examiner* — Tony G Soohoo
*Assistant Examiner* — Anshu Bhatia
(74) *Attorney, Agent, or Firm* — Gable Gotwals

(57) ABSTRACT

A method and system for controlling an interface emulsion layer within an oil treatment vessel includes injecting a water flow through a plurality of radial eductors arranged about a radial eductor manifold located in the brine water layer. Each radial eductor is oriented vertically to the radial eductor manifold and the horizontal axis of the oil treatment vessel. The water flow through the plurality of radial eductors causes a swirling flow pattern in a volume of water around each radial eductor that is effective for promoting a collapse of the interface emulsion layer. The water flow through each radial eductor, which may be a recycled water flow, may be in a range of about 1 to 5 feet per minute.

10 Claims, 11 Drawing Sheets

Related U.S. Application Data application No. 13/248,899, filed on Sep. 29, 2011, now Pat. No. 9,115,316.

(51) Int. Cl.
- *B01D 17/04* (2006.01)
- *C10G 31/08* (2006.01)
- *B01D 17/02* (2006.01)
- *B01D 17/12* (2006.01)
- *B01D 19/00* (2006.01)
- *B01D 21/00* (2006.01)
- *B01D 21/02* (2006.01)
- *B01D 21/24* (2006.01)
- *B01J 4/00* (2006.01)
- *C10G 33/06* (2006.01)
- *B08B 9/093* (2006.01)

(52) U.S. Cl.
CPC .... *B01J 2204/002* (2013.01); *B01J 2204/005* (2013.01); *B01J 2219/182* (2013.01); *B01J 2219/1943* (2013.01); *C10G 2300/4081* (2013.01); *C10G 2300/805* (2013.01)

(56) References Cited

U.S. PATENT DOCUMENTS

| | | |
|---|---|---|
| 3,586,294 A | 6/1971 | Strong |
| 3,592,756 A | 7/1971 | Jarvis |
| 4,291,549 A | 9/1981 | Fujimura et al. |
| 4,554,074 A | 11/1985 | Broughton |
| 4,812,045 A | 3/1989 | Rivers |
| 5,132,025 A | 7/1992 | Hays |
| 5,612,490 A | 3/1997 | Carlson et al. |
| 6,010,634 A | 1/2000 | Sams et al. |
| 6,033,901 A * | 3/2000 | Powell, Jr. ............ B01D 17/00 435/281 |
| 6,416,675 B1 | 7/2002 | McCasland |
| 6,730,229 B1 | 5/2004 | Pandya |
| 6,821,011 B1 | 11/2004 | Crump |
| 7,597,747 B1 | 10/2009 | Nagel |
| 7,726,870 B1 | 6/2010 | Lott |
| 2004/0035799 A1 | 2/2004 | Smith |
| 2008/0000846 A1 | 1/2008 | Teichroeb et al. |
| 2009/0294375 A1 | 12/2009 | Lange et al. |
| 2010/0080077 A1 | 4/2010 | Coy |
| 2010/0187186 A1 | 7/2010 | Howdeshell et al. |

\* cited by examiner

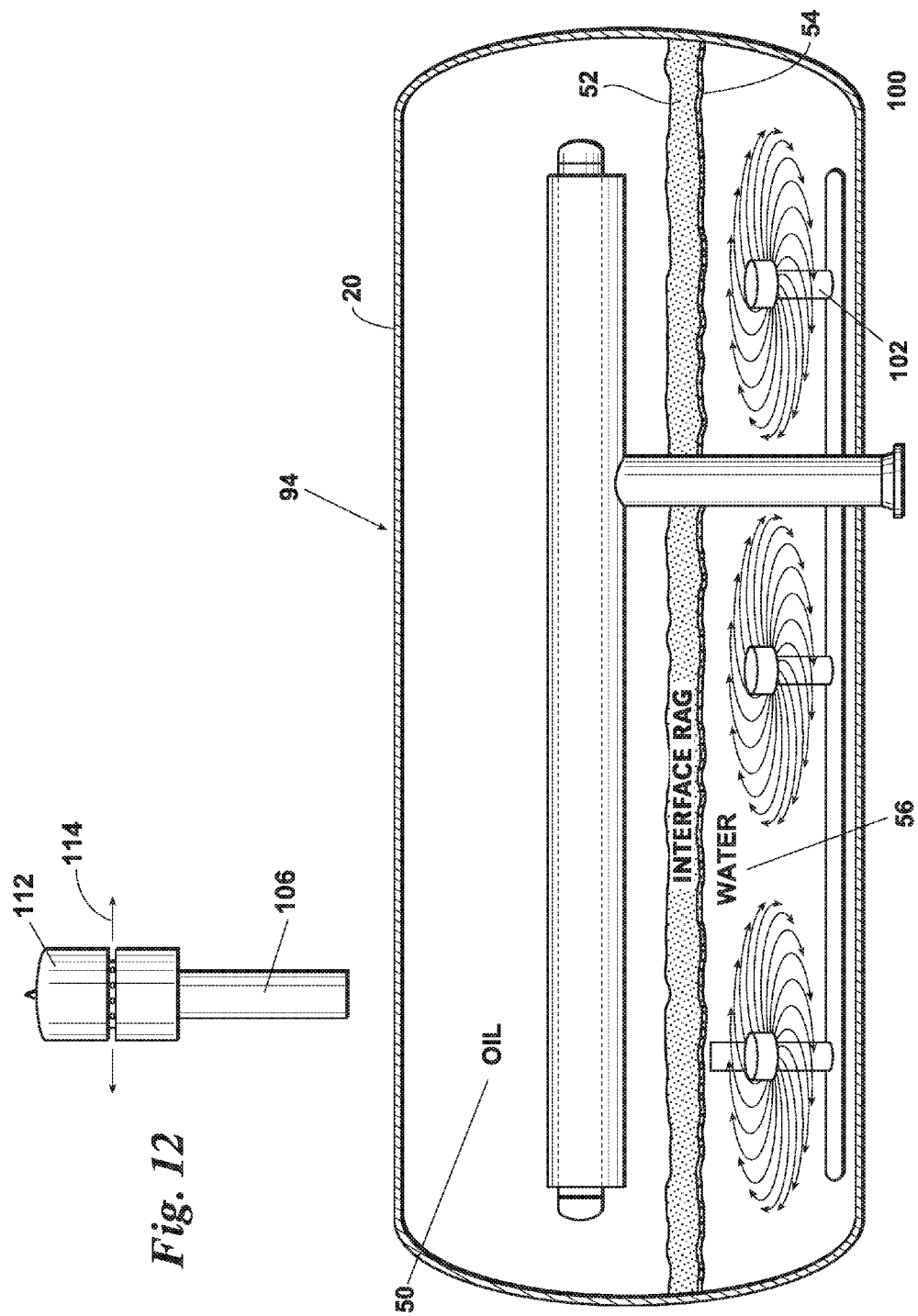

INTERFACE AND MUD CONTROL SYSTEM AND METHOD FOR REFINERY DESALTERS

CROSS-REFERENCE TO OTHER APPLICATIONS

This application is a continuation-in-part application of U.S. patent application Ser. No. 14/138,390, filed Dec. 23, 2013, which was a divisional application of U.S. patent application Ser. No. 13/248,899, filed Sep. 29, 2011, which issued as U.S. Pat. No. 9,115,316 on Aug. 25, 2015, the contents of which are hereby incorporated by reference in their entirety.

BACKGROUND

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

This disclosure relates to systems and methods used in crude oil production. More specifically, the disclosure relates to methods for treating and controlling a first solid-laden water layer or "rag" that accumulates at the oil/water interface within separation, dehydration, or desalting equipment and a second solid-laden layer or "mud" that accumulates at the bottom of the separation, dehydration, or desalting equipment.

Once oil is produced it must be dehydrated and desalted to reduce the corrosion effect on production systems such as transportation carriers, pipelines, and refineries. The dehydration and desalting done at the oil producing facility is capable of removing the majority of the water and salts prior to delivery to a refinery. Once the oil is at the refinery it is desalted again to reduce the salts to even lower and less corrosive levels. In addition to the water and dissolved salts carried by the oil, there may be a large quantity of solids ranging in size from very small sub-micron particles or fines to larger particles such as sands. The larger particles are readily removed by the oil production facility leaving the finer particles to be removed at the refinery.

In general, the smallest particles may contribute to the stability of an oil-water emulsion by forming a barrier around the water droplets thus preventing droplet coalescence and separation. Water droplets that are surrounded by these fines may be large enough to settle in the electrostatic desalter, but they are hindered from coalescing by the fines. The effect is for this solid-laden water layer to accumulate at the oil-water interface as a "rag." As this rag layer collapses the fines settle to the bottom of the vessel to form a "mud" layer where they must be removed periodically by a mud wash system.

This mud wash system consists of a set of spray nozzles that disperse a volume of fresh water into the desalter to agitate the mud so it can be effectively removed from the desalter. Two primary methods for mud removal are practiced. One method is to do a timed mud wash where the vessel is washed only periodically as determined by the unit operator. The frequency depends on the solids (mud) loading and may be once per day or once per week, as examples. The periodic mud wash sends high levels of oil wet solids to the water treatment facility where it must be handled for disposal. These periodic injections of oil wet solids can initiate an upset in the water quality.

The other method is a semi-continuous mud wash where sections of a vessel are washed sequentially. Upon the completion of all sections, the sequence is restarted. The semi-continuous wash levels the load of solids that are passed to the water treatment vessels. In both the semi-continuous and periodic methods, solids are still allowed to settle in the bottom of the vessel where they can only be partially removed by each subsequent periodic washing.

While either method can handle the volume of fines in a refinery desalter, there remains another problem that has not been properly dealt with before. This problem is the solid-laden rag that hangs at the oil-water interface. Once this interface mud accumulates at the interface it becomes quiescent and the rate of water and solids separation is slowed. When the rate of collapse for interface rag is slower than the rate of accumulation, the interface volume increases and interferes with the desalter operation. While the exact nature of this interface rag cannot be readily determined, the effects are detrimental to the performance of the desalter in one of two ways.

If the interface rag floats on top of the water, then it can grow in height until it interferes with the integrity of the electrostatic field by increasing the current demand and reducing the field strength. The electric field does apply added energy to the top of the interface and can accelerate the rate of decay. If the interface sinks into the water layer it rapidly occupies the water volume of the desalter and reduces the water residence time. The effect is a decline in the water quality that is passed to the water treatment facility as the interface rag settles to the bottom of the vessel to form mud and mixes with the brine exiting to the brine heat exchangers and benzene recovery unit. This mixing accelerates the fouling and plugging of the heat exchangers and benzene recovery unit.

Because refineries have more complex and overlapping issues, system applications need to be expanded beyond the simple purpose of removing sludge and solids from the bottom of desalter vessels. A need exists, therefore, for a system that assists a refinery in meeting planned crude unit run-length expectations, does not put the desalter in an upset condition during operation, minimizes or eliminates sludge buildup at the bottom of the vessel, improves basic sediment and water (BS&W) reduction performance, improves salt reduction performance, minimizes emulsion and reverse emulsion buildup at the oil/water interface, keeps solids suspended in the brine until the solids exit to the process sewer, and protects process equipment ahead of the waste water treatment plant.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

A method for controlling an interface emulsion layer within an oil treatment vessel includes injecting a water flow through a plurality of radial eductors arranged about a radial eductor manifold oriented in a horizontal plane and located in a brine water layer of the oil treatment vessel. The water flow causes a swirling flow pattern of a volume of water in the brine water layer around each radial eductor that agitates the lower surface of the interface emulsion layer, helping to break down the interface emulsion layer and reducing its accumulation within the vessel.

A system for controlling an interface emulsion layer within an oil treatment vessel includes a radial eductor manifold having a plurality of radial eductors located in a brine water layer residing within the oil treatment vessel. Each radial eductor is oriented in a vertical plane relative to the center line of the radial eductor manifold and the horizontal axis of the vessel. Water flowing through the radial eductors creates a swirling flow pattern to agitate a lower surface of the interface emulsion layer residing between the brine water layer and the oil layer in the oil treatment vessel. The system may further include a means for recycling a volume of the brine water layer to the radial eductor manifold, such as a recirculating pump and recycling piping.

A better understanding of the method and system for controlling the interface emulsion layer will be obtained from the following detailed description taken in conjunction with the drawings and the attached claims.

BRIEF DESCRIPTION OF THE DRAWINGS

So that the manner in which the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

FIG. 4A illustrates the flow pattern of FIG. 4 in greater detail. The flow pattern is a rotating plane toroidal flow that consumes each sector and looks like a series of large horizontal plane doughnuts.

FIG. 12 is a side view of the radial eductor of FIG. 7 showing the eductor stem, outer cap, and exit portal.

FIG. 13 illustrates the turbulence of the water layer caused by the radial eductors of the radial eductor manifold of FIG. 7.

DETAILED DESCRIPTION

Figure 1:
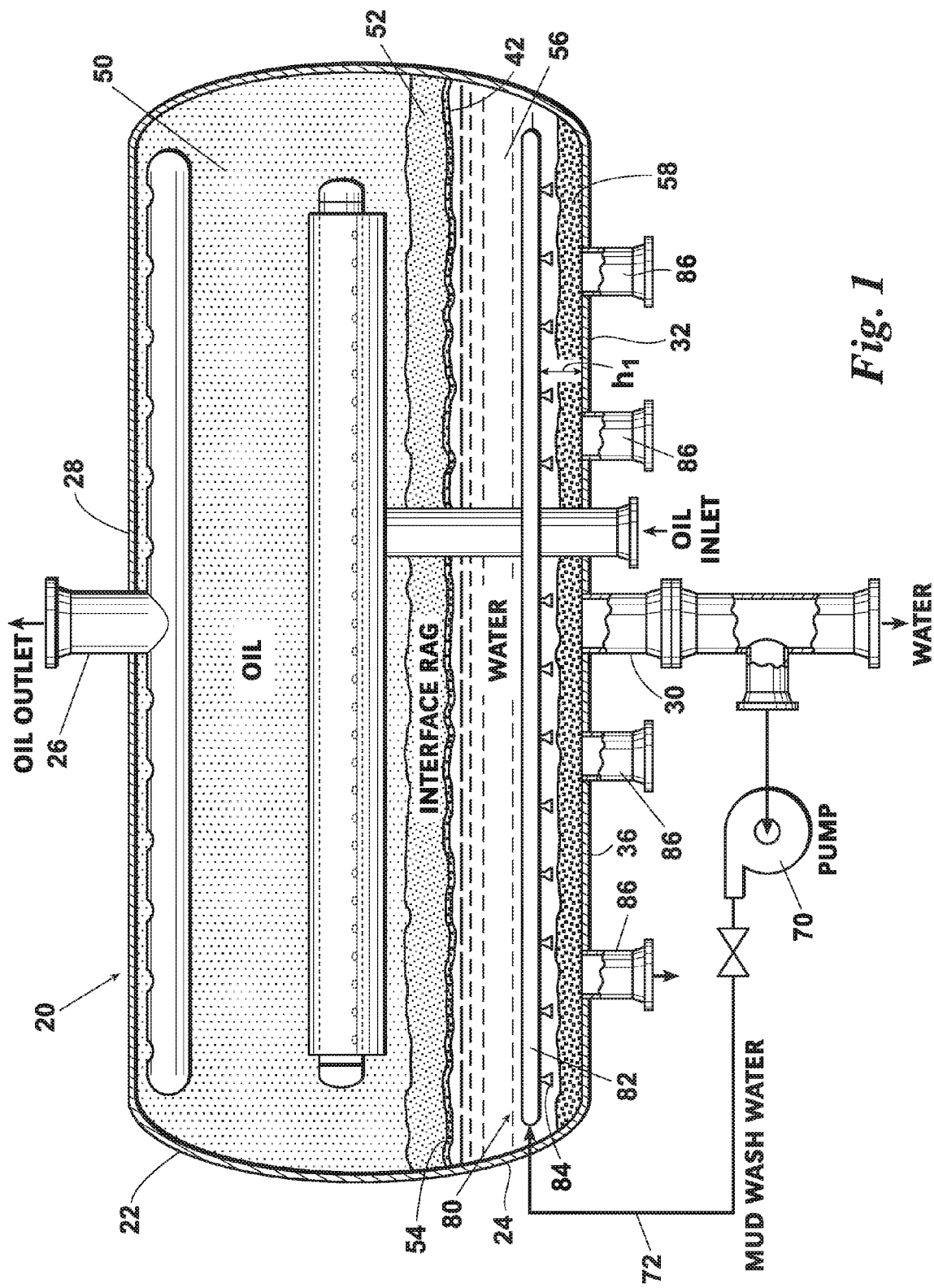
FIG. 1 is a view of a prior art desalter equipped with a mud washing system. The washing system has a set of spray nozzles that disperse a volume of fresh water into the desalter to agitate the mud that has settled at the bottom of the vessel so that the mud can be removed from the desalter through a series of mud drains located at the bottom of the desalter. This system does not address the solid-laden rag that collects and hangs at the lower surface of the oil-water interface layer.

The subject disclosure is further described in the following detailed description, and the accompanying drawing and schematic of non-limiting embodiment of the subject disclosure. The features depicted in the figure are not necessarily shown to scale. Certain features of the embodiments may be shown exaggerated in scale or in somewhat schematic form, and some details of elements may not be shown in the interest of clarity and conciseness.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims, the terms "connect", "connection", "connected", "in connection with", and "connecting" are used to mean "in direct connect with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream", "above" and "below", and other like terms indicated relative positions above or below a given point or element are used in this description to more clearly describe some embodiments of the disclosure.

The present disclosure provides a method and system for preventing mud build-up within a separator vessel by continuously agitating the lower surface of the interface emulsion layer so as to suspend solids in the water layer and promote the collapse of emulsion residing in the interface emulsion layer. Elements illustrated in the drawings are identified by the following numbers:

| | | | |
|---|---|---|---|
| 10 | Interface emulsion control system | 56 | Water layer |
| 20 | Separator vessel | 58 | Oil-coated solids/mud |
| 22 | Upper portion of 20 | 60 | First piping circuit |
| 24 | Lower portion of 20 | 62 | Nozzle |
| 26 | Oil outlet | 64 | Outer periphery of 60 |
| 28 | Top of 20 | 66 | Inner periphery of 60 |
| 30 | Water outlet | 68 | Centerline of 60 |
| 32 | Bottom of 20 | 70 | Recycle pump |
| 34 | Rag drain | 72 | Recycle piping |
| 36 | Inner wall surface of 20 | 80 | Mud wash system |
| 38 | Recycle pump | 82 | Piping |
| 40 | Recycle piping | 84 | Spray nozzle |
| 42 | Interface rag | 86 | Mud drain |
| 50 | Oil layer | 88 | Second piping circuit |
| 52 | Interface emulsion layer | 90 | Supports |
| 54 | Lower surface of 52 | 92 | Nozzle |
| 94 | Interface emulsion control system | 96 | Recirculating pump |
| 98 | Recycle piping | 100 | Radial eductor manifold |
| 102 | Radial eductor | 104 | Eductor shell |
| 106 | Eductor stem | 108 | Exit slot |
| 110 | Inner bore | 112 | Outer cap |
| 114 | Exit portal | 116 | Recycle valve |

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation. as in any engineering or design project. numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring first to FIG. 1, a separator vessel 20 is connected by conventional piping (not shown) to a crude oil source. Vessel 20 is of a type well-known in the art and commonly used in crude oil production and refining for dehydration and desalting of crude oil. A crude oil stream containing water and solid contaminants enters vessel 20 through the identified "oil inlet". Vessel 20 may hold those components and processes them so that the oil is separated from the contaminants. The separated oil layer 50 is then removed from vessel 20 through an outlet 26 located at the top 28 of vessel 20.

Figure 2:
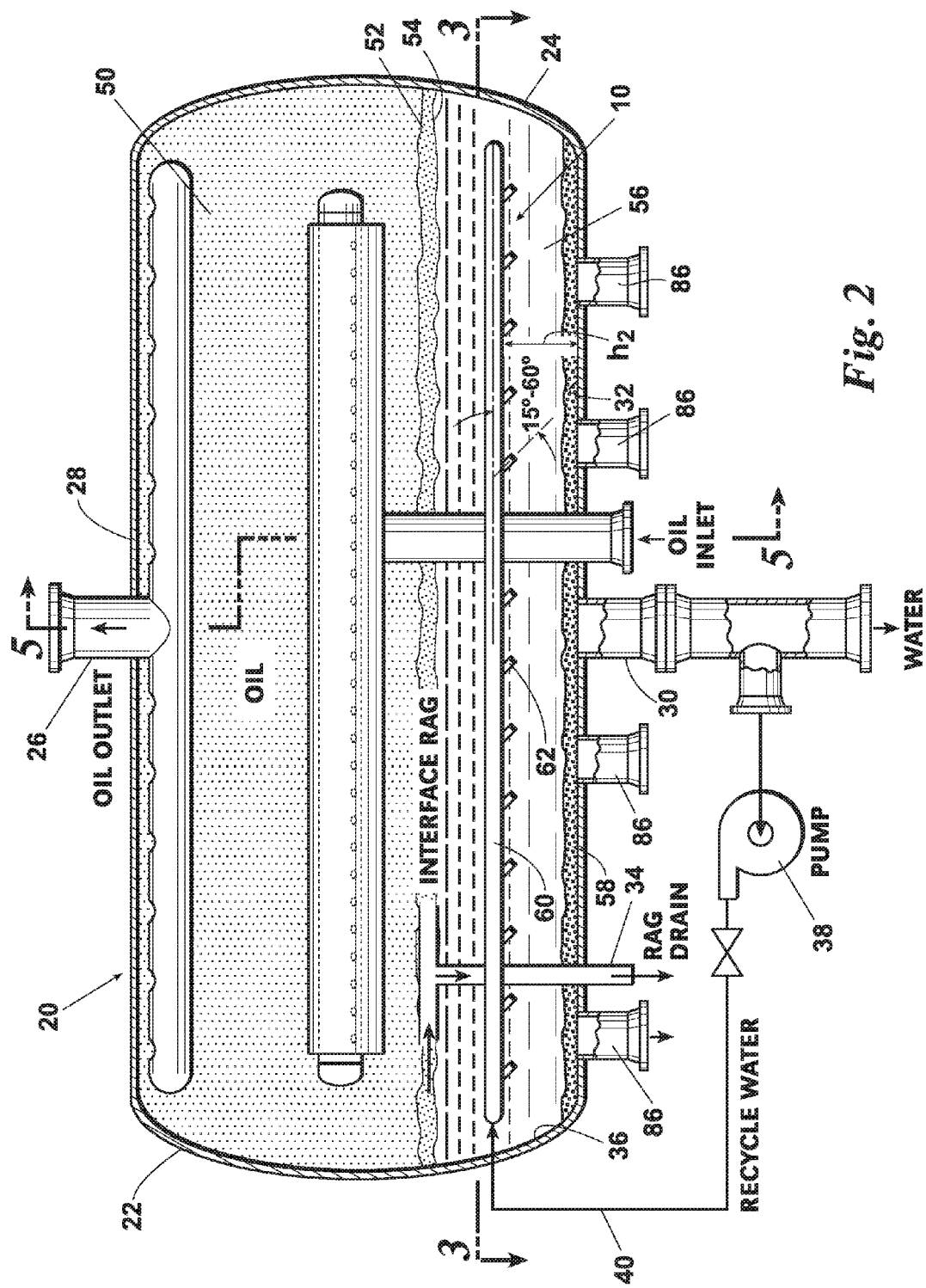
FIG. 2 is a view of another embodiment of a desalter equipped with a wash system made according to this disclosure. The wash system includes a piping circuit that is equipped with a series of nozzles oriented at an angle in the horizontal plane and also at a downward angle in the vertical plane. Water from the water layer is recycled into the piping circuit and re-injected into the water layer at a low flow rate.

During the separation process, it is common for oil-coated solids, called mud 58, to accumulate on a bottom 32 of vessel 20 and for a layer comprising a mixture of oil and water, called interface emulsion layer 52, to form in an intermediate portion of vessel 20. A solid-laden or brine water layer 56 accumulates between the layer of mud 58 residing on the bottom 32 and the layer of interface rag or emulsion 52. To prevent the interface rag layer or emulsion 52 from accumulating until its presence begins to interfere with the performance of vessel 20, a rag drain 34 may be provided (see FIG. 2). The removal of the interface rag layer or emulsion 52 may occur continuously and the removal rate may vary over time. Oil layer 50 accumulates above the interface emulsion layer 52 in the upper portion 22 of vessel 20.

Some "rag," referred to as interface rag 42, rather than settling to the bottom 32 of vessel 20, may float on top of the water layer 56 and "hang" at the lower surface 54 of the interface emulsion layer 52 as shown in FIG. 1. As this interface rag 42 accumulates it becomes quiescent and the rate of water and solids separation is slowed. When the rate of collapse and settlement of interface rag 42 is slower than the rate of its accumulation, the volume of interface emulsion layer 52 increases and begins to interfere with the operation of vessel 20. For example, interface rag 42 may sink into the water layer 56 and occupy water volume, thereby reducing water residence time, decreasing the quality of water passed to a treatment facility. Additionally, interface emulsion layer 52 may grow in height until it interferes with the integrity of an electrostatic field (not shown in the drawings) being applied to promote separation of components in the crude oil. Furthermore, as the interface rag 42 collapses it settles to the bottom 32 of vessel 20 and contributes to oil coated solids/mud 58 that accumulates in the vessel bottom. This oil-coated solids/mud 58 may be removed periodically, for example, by way of a prior-art mud wash system 80 (see FIG. 1).

A mud wash system 80, as known in the prior art, includes piping 82 arranged in sections along a lower portion 24 of vessel 20 at a distance "$h_1$" from the bottom 32 of vessel 20 (which may be in the bottom third of water layer 56). Piping 82 may include two outer pipes (not shown) that run near and along the interior wall surface 36 of vessel 20 and one middle pipe (not shown) spaced equidistant from, and running parallel to, each outer pipe. A series of spray nozzles 84 are connected to the piping 82 and oriented downward at about a 90° angle relative to a centerline line of piping 82. The spray nozzles 84 disperse a volume of water into the desalter to agitate the mud 58 so it can be effectively removed from the desalter by way of mud drains 86. A recycle pump 70 and recycle piping 72 may be employed to recycle the mud wash water.

Prior-art mud wash system 80 does not prevent the build-up of mud 58. This system also does not prevent episodic build-up of the interface emulsion layer 52, nor does it reduce salt, reduce basic sediment and water (BS&W), eliminate interface rag 42, or eliminate reverse emulsion migration from interface emulsion layer 52 to water layer 56.

Referring to FIGS. 2-5, a system 10 is illustrated for slowly and continuously agitating the interface emulsion layer 52 to prevent or control the build-up of interface emulsion layer 52 and keep the fines that contribute to mud layer 58 suspended in the brine water layer 56. System 10 (to be described) imparts enough velocity and motion into the water layer 56 to suspend solids therein until they are removed with water layer 56 as it is removed from vessel 20 and also creates a washing action under interface rag 42 to aid in water-wetting solids and recovery of oil to oil layer 50. System 10, which is capable of servicing desalter operations across a full range of API gravity crude oils, may not utilize filters.

Figure 3:
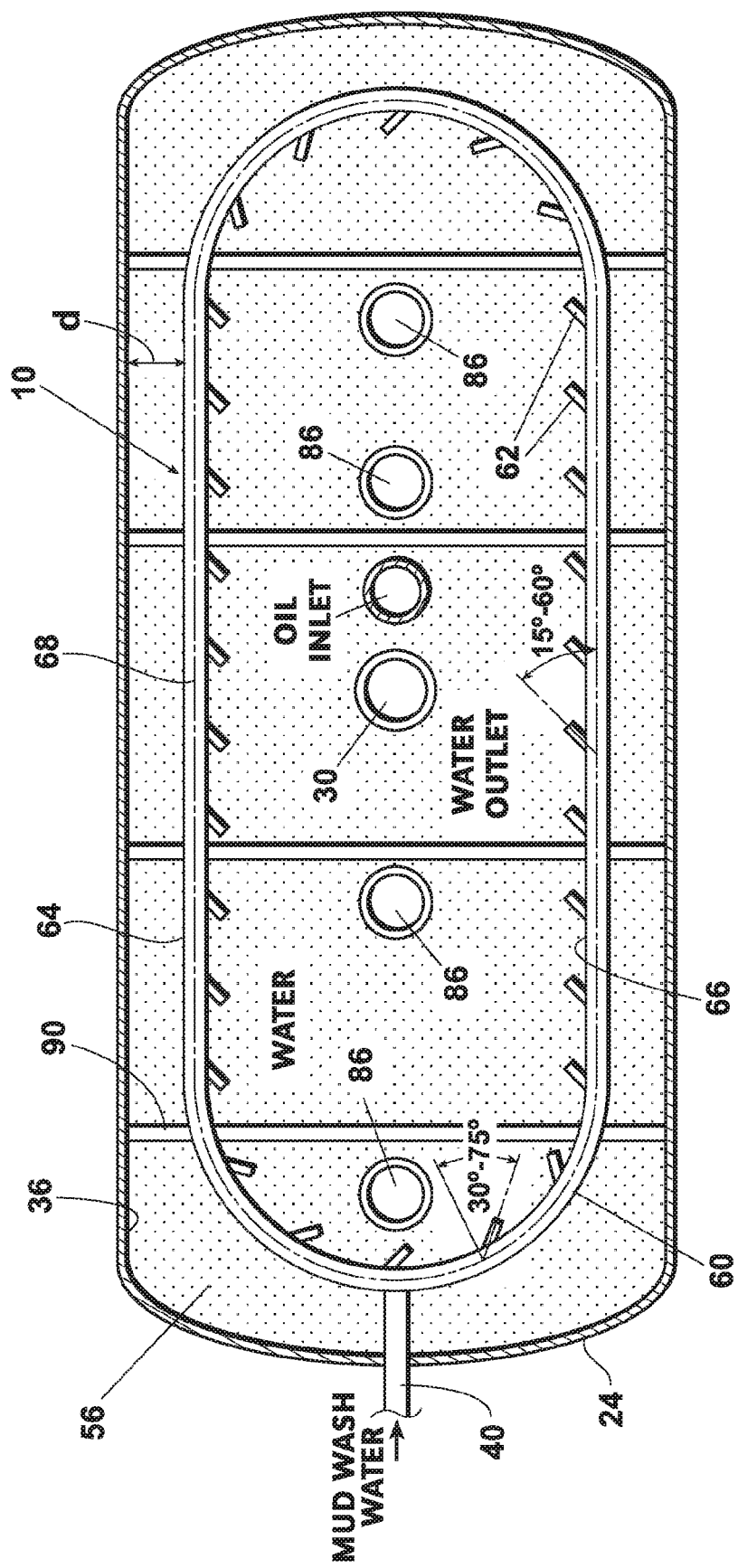
FIG. 3 is a top view of the wash system of FIG. 2 and illustrates the spacing relationship between the oblong-shaped piping circuit and the interior wall of the desalter. The piping circuit may be laid across horizontal supports as illustrated and clamped in place.

System 10 includes an oblong-shaped first piping circuit 60 that is located in a lower portion 24 of vessel 20. The outer peripheral surface 64 of first piping circuit 60 is at distance "d" from the inner wall surface 36 of vessel 20. The piping circuit 60 is also at a distance "$h_2$" from the bottom 32 of vessel 20. In an embodiment, distance $h_2$ places first piping circuit 60 in the upper two-thirds of the height of water layer 56 in vessel 20. First piping circuit 60 may be supported by a set of horizontal supports 90 as seen in FIG. 3.

First piping circuit 60 produces a slow circulation of water layer 56 and, therefore, a slight water velocity across the lower surface 54 of the interface emulsion layer 52. This slight velocity, which is established by a series of angled nozzles 62, prevents build-up of interface rag 42 and reduces or eliminates mud 58. Furthermore, the continuous circulation helps keep fines suspended in water layer 56 so that the fines are discharged directly with the discharge of water layer 56, thus eliminating frequent mud wash of vessel 20.

Nozzles 62 are arranged and spaced about the inner periphery 66 of first piping circuit 60 (see FIG. 3) and may be pointed interiorly of vessel 20. Nozzles 62 may be drilled passageways in first piping circuit 60 or may be, as illustrated, short length tubular members. Each nozzle 62 may be oriented at an angle of between about 15° and 60° in a horizontal plane relative to a line perpendicular to centerline 68 of first piping circuit 60 and at a downward angle of between about 15° and 60° in the vertical plane. The about 15° to 60° angle translates to about a 30° to 75° angle between a line drawn through the longitudinal centerline of the nozzle 62 and a line drawn perpendicular to centerline 68. The horizontal and vertical plane angle may be about 45°. Alternatively, each nozzle 62 may be oriented at between about 105° and 150° in the horizontal plane, thereby promoting a clockwise (opposite) flow.

Figure 4:
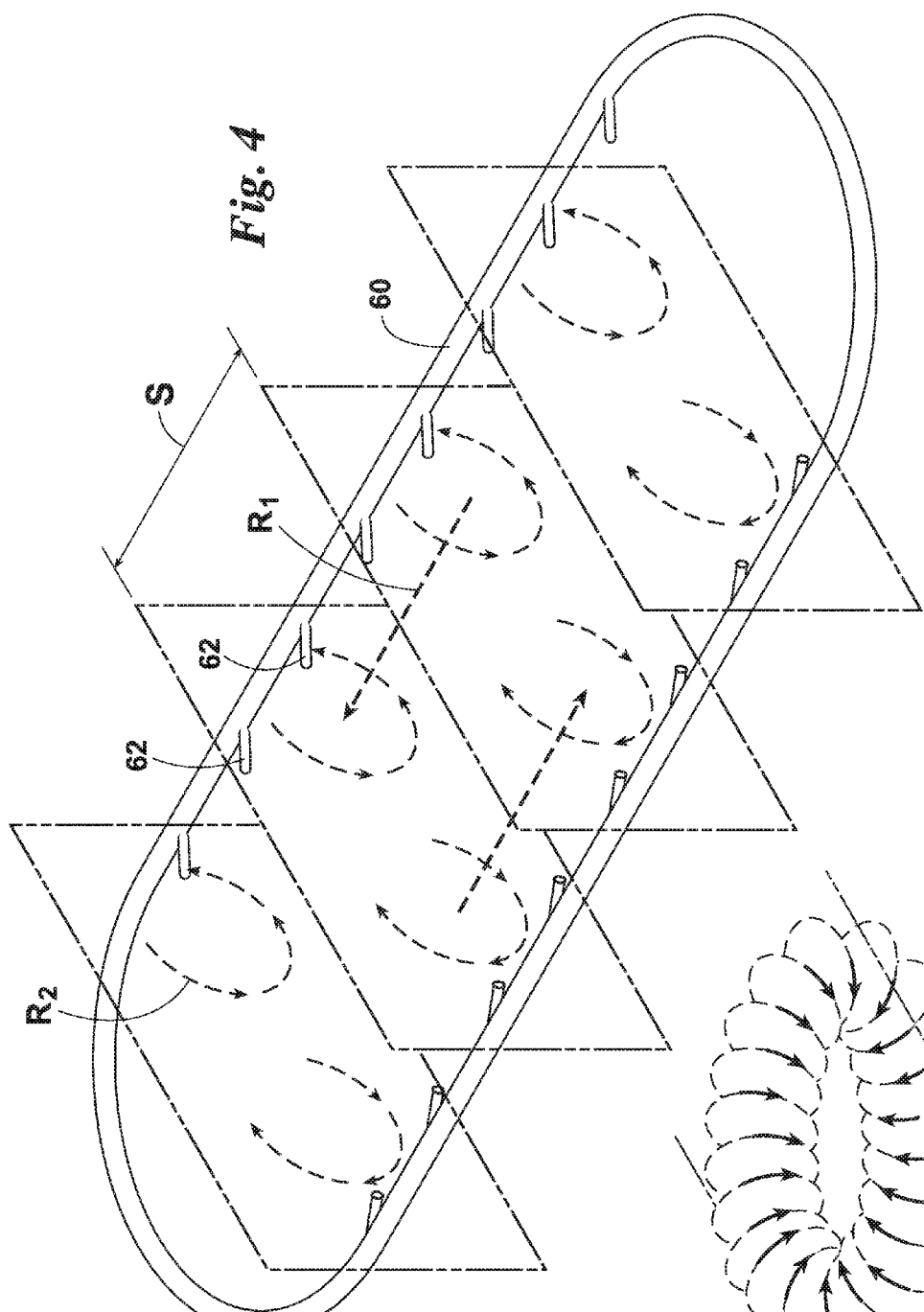
FIG. 4 illustrates the turbulence of the water layer caused by the nozzles of the piping circuit of FIG. 2. Once the flow from the nozzles is established, the bulk of the water layer will begin to rotate slowly in a toroidal-shaped rotation in the vertical plane and in the horizontal plane. These combined rotations prevent the build-up of mud by lifting the fines from the bottom of the desalter and continuously agitating the lower surface of the interface rag layer.
Figure 5:
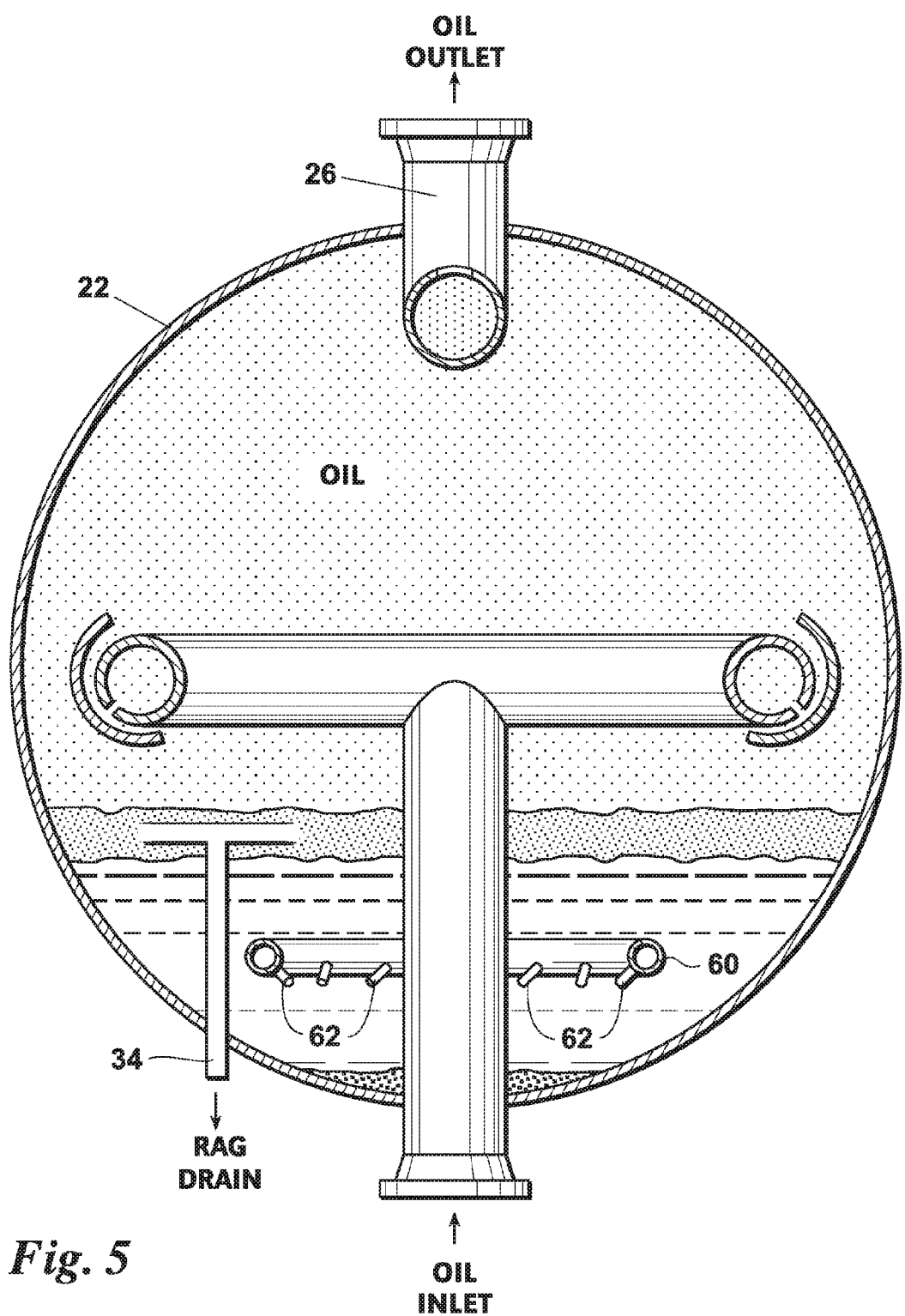
FIG. 5 is a vertical cross-sectional view taken along the line 5-5 of FIG. 2.

Referring to FIGS. 4 & 4A, the water flow through each nozzle 62 may be at a low flow rate in the range of about 1 to 3 feet per minute (fpm). Once the flow from the nozzles 62 is established, the bulk of water layer 56 will begin to rotate slowly and in two directions, $R_1$ and $R_2$. Rotation $R_1$ is in a horizontal plane coincident to the clockwise or counterclockwise orientation of nozzles 62. Rotation $R_2$ is a toroidal-shaped rotation in a vertical plane. Rotations $R_1$ and $R_2$ continuously agitate the lower surface 54 of the interface emulsion layer 52 and keep the solids suspended in water layer 56 by lifting the fines from the bottom 32 of vessel 20. The flow pattern created by $R_1$ and $R_2$ is substantially a rotating plane toroidal flow that consumes each sector S and looks like a series of large horizontal plane doughnut-shaped flows (see FIG. 4A).

Controls (not shown) may be provided to control the water flow through nozzles 62, with first piping circuit 60 being controlled independent of second piping circuit 88. The flow may be adjusted, for example, to bring the level or volume of the interface emulsion layer 52 within a predetermined range.

Water removed from vessel 20 through water outlet 30 may be routed to a recycling pump 38 for recycling the water back into the water layer 56. Recycling pump 38 may be an ANSI/API centrifugal pump including duplex seals with barrier fluid and an expeller on the back of the impeller to protect seal integrity. No filtration is required in the recycle piping 40.

In an embodiment, after the initial lineout of desalter operation, the water flow rate through nozzles 62 is increased until interface rag layer 52 begins to upset. The water flow rate is then reduced until interface emulsion layer 52 begins to stabilize. Interface rag layer 52 is then monitored at the first tryline under the interface emulsion layer 52 and appropriate adjustments made to the water flow rate.

Figure 1A:
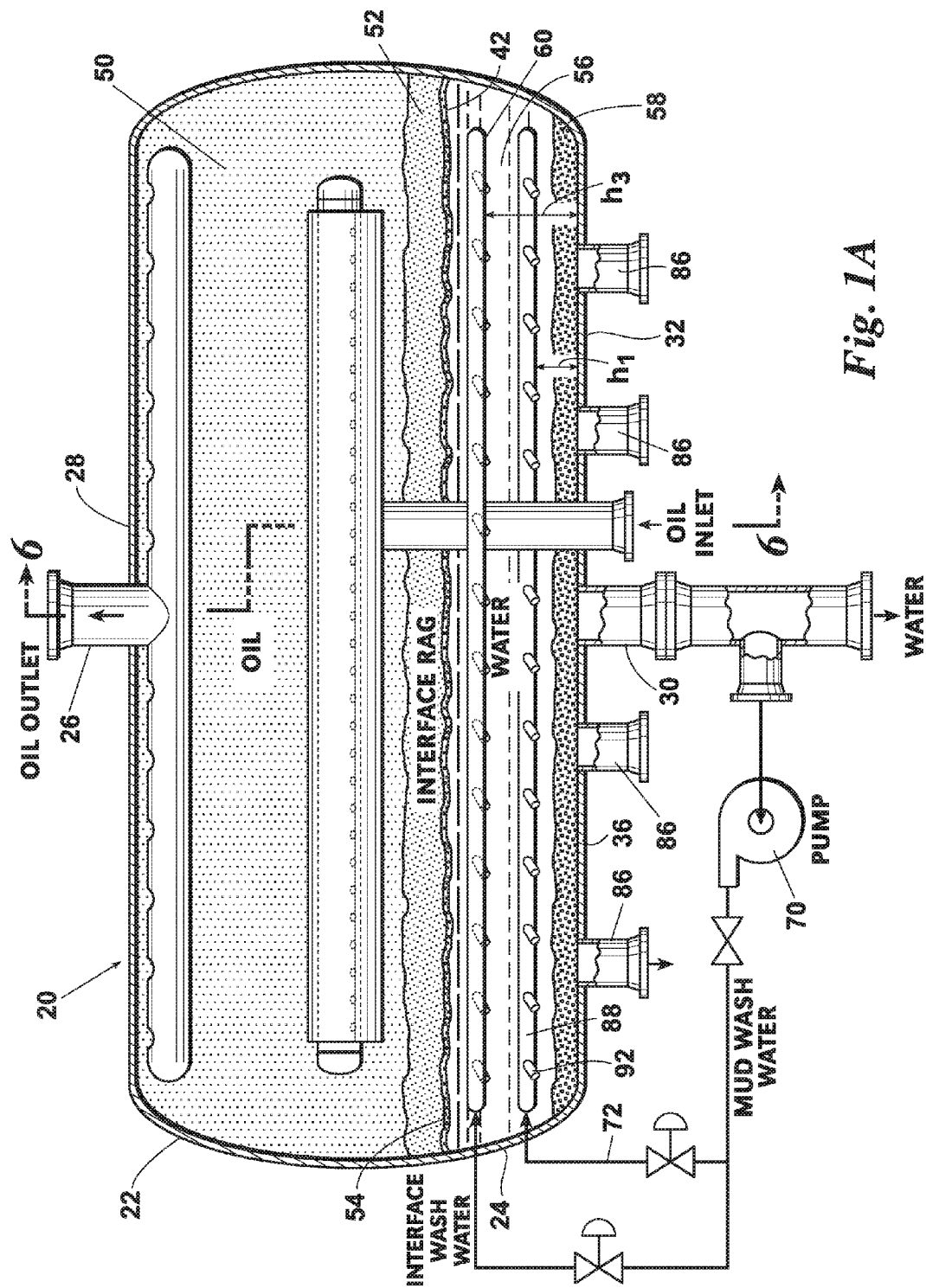
FIG. 1A is a view of an embodiment of a desalter equipped with a wash system made according to this disclosure. Two piping circuits are equipped with a series of nozzles and independently controlled. The first piping circuit, which is placed below the interface rag layer, includes a set of nozzles oriented to gently scrub the bottom of the interface rag and promote separation. The second piping circuit, which is placed above the mud layer, includes a set of nozzles oriented oblique to the mud layer to gently fluidize the mud from the bottom of the vessel.
Figure 6:
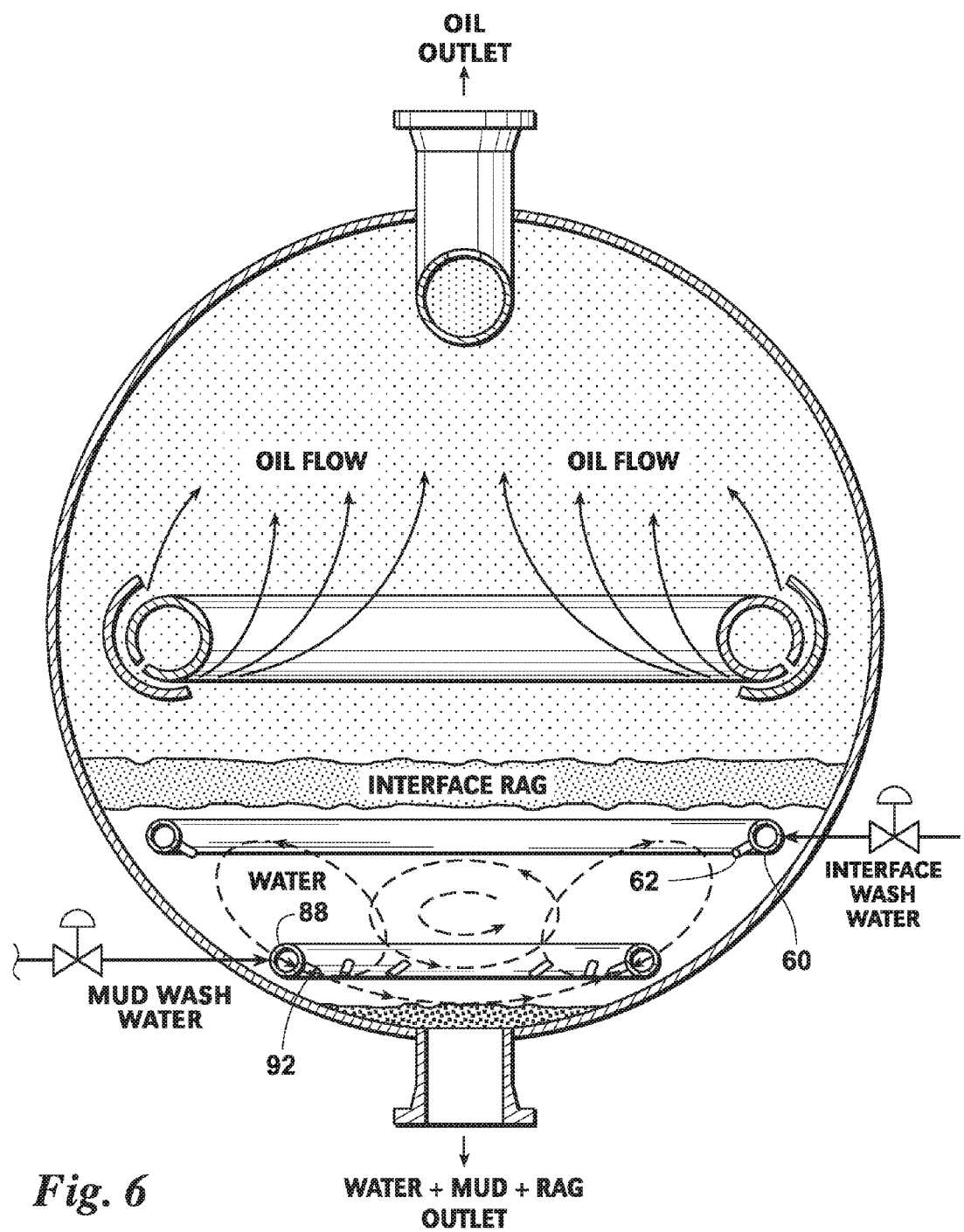
FIG. 6 is a vertical cross-sectional view taken along section line 6-6 of FIG. 1A.

Referring now to FIGS. 1A & 6, an embodiment of system 10 includes an oblong-shaped first piping circuit 60 and an oblong-shaped second piping circuit 88, each equipped with nozzles 62, 92 and independently controlled. The water flow through each nozzle 62, 92 may be at a low flow rate in the range of about 1 to 3 feet per minute (fpm). First piping circuit 60 is placed below the interface emulsion layer 52 at a distance "$h_3$" from the bottom 32 of vessel 20 in order to gently scrub the bottom of the interface emulsion layer 52. Nozzles 62 may be oriented at an angle of between about 15° and 60° in a horizontal plane and in a vertical plane relative to centerline 68 of first piping circuit 60 (see FIGS. 2 & 3).

Second piping circuit 88 is placed at a distance "$h_1$" from the bottom 32 of vessel 20 in order to gently fluidize the mud 58 from the bottom 32 of the vessel 20. Unlike the arrangement of the prior art mud wash system 80 and its nozzles 84 (see FIG. 1), second piping circuit 88 is an oblong-shaped circuit similar to that of first piping circuit 60, with its nozzles 92 oriented oblique to the mud layer 58. Nozzles 92 may be oriented at an angle of between about 15° and 60° in the horizontal plane relative to the centerline of second piping circuit 88 and at a downward angle of between about 15° and 60° in the vertical plane. There may be no interference between the upper and lower toroids.

A system 10 made according to this disclosure affects a number of performance issues associated with a separator vessel 20. System 10 eliminates or minimizes episodic build-up of the interface emulsion layer 52, reduces salt, reduces basic sediment and water (BS&W), eliminates rag layer separation, and eliminates reverse emulsion migration from the interface rag to the brine water layer.

Figure 7:
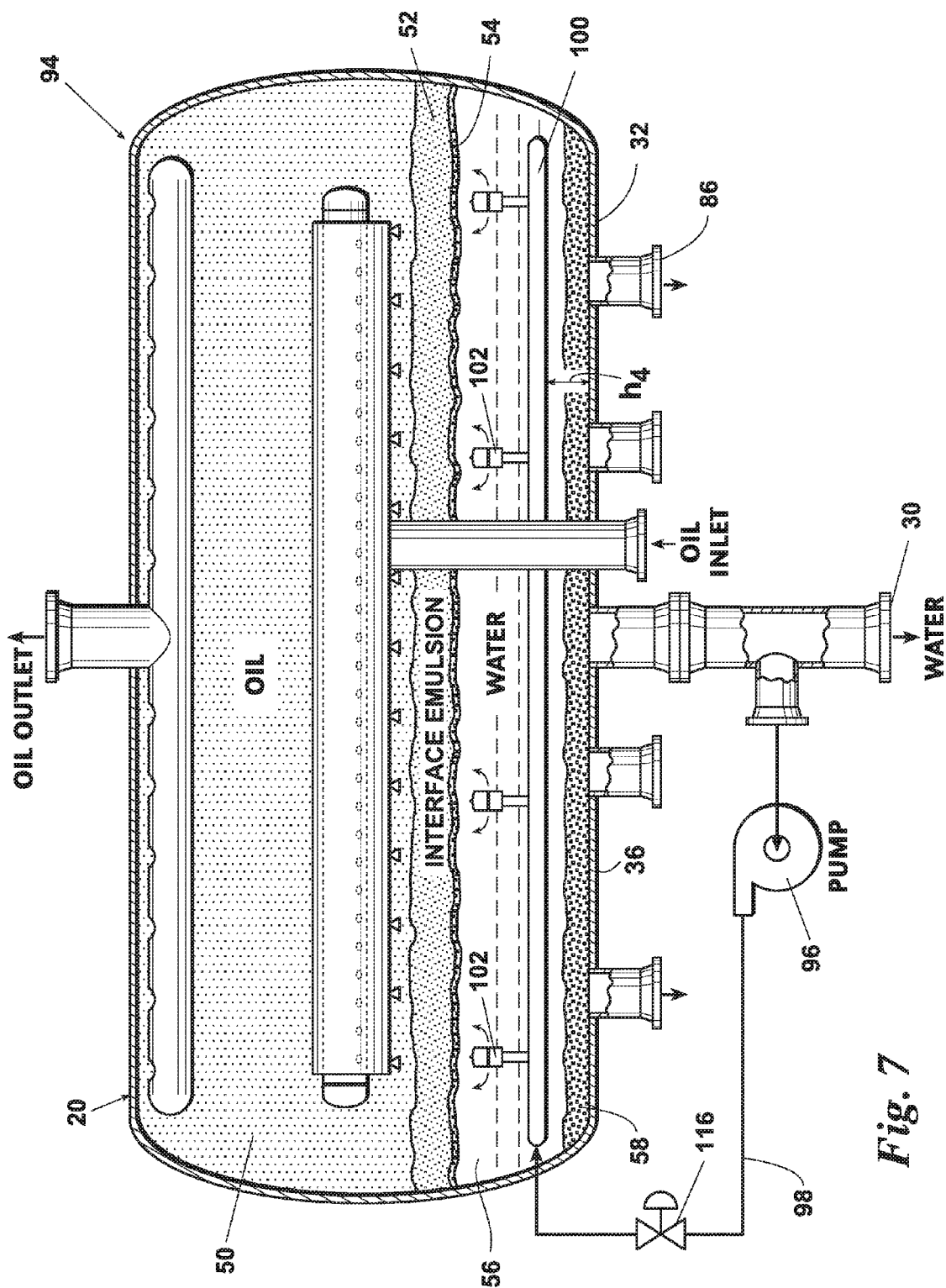
FIG. 7 is a view of an embodiment of an oil treatment vessel equipped with a system made according to this disclosure. The embodiment includes a radial eductor manifold equipped with a plurality of radial eductors that cause a swirling flow pattern within the water layer around each radial eductor. The swirling flow pattern agitates the bottom of the interface emulsion layer and promotes separation.
Figure 9:
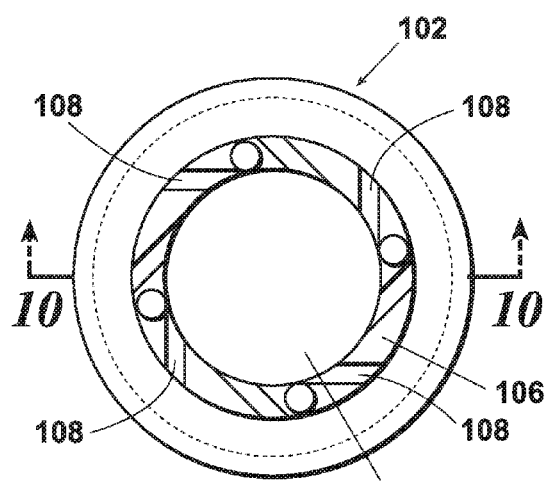
FIG. 9 is a horizontal cross-sectional view taken along the line 9-9 of FIG. 8.
Figure 11:
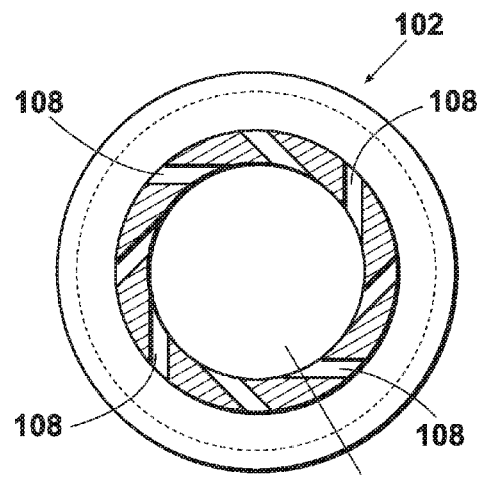
FIG. 11 is a horizontal cross-sectional view taken along the line 11-11 of FIG. 8.
Figure 8:
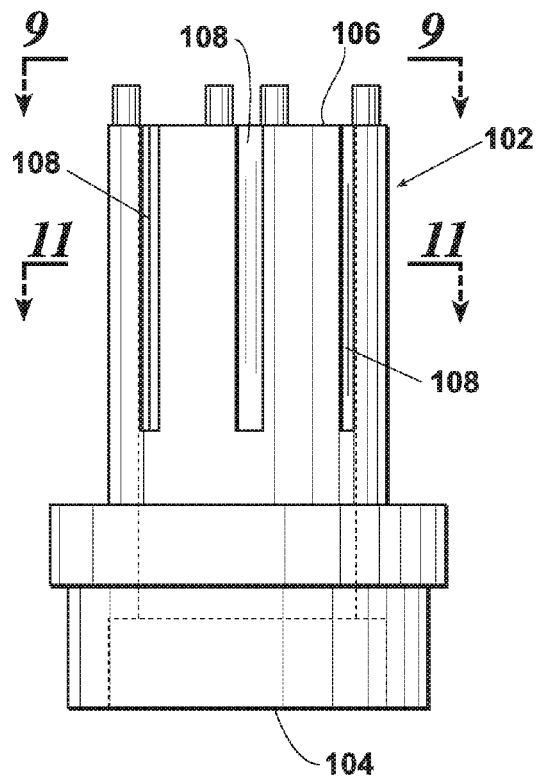
FIG. 8 is a side view of the radial eductor of FIG. 7 with the outer cap removed.
Figure 10:
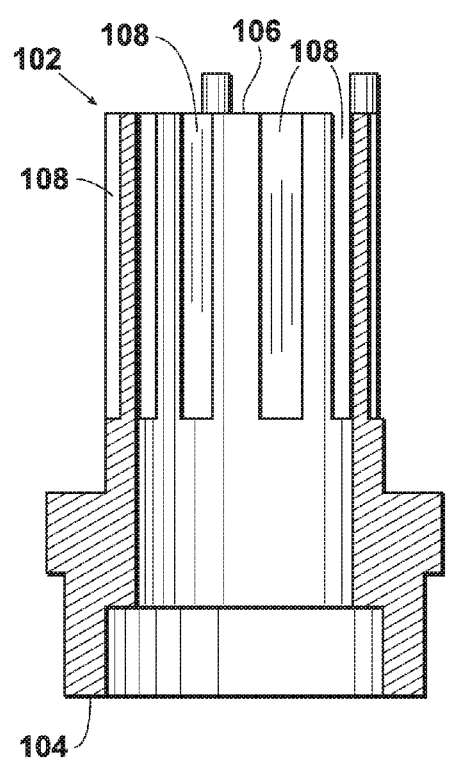
FIG. 10 is a vertical cross-sectional view of the radial eductor taken along the line 10-10 of FIG. 9.

Referring now to FIG. 7, an embodiment of an interface emulsion control system 94 includes a radial eductor manifold 100 supporting a plurality of radial eductors 102. The radial eductor manifold 100 is placed at a distance "$h_4$" from the bottom 32 of separator vessel 20, below the interface emulsion layer 52, and within the upper two-thirds portion of the water layer 56. Each radial eductor 102 is oriented in a vertical plane relative to the radial eductor manifold 100 and the horizontal axis of the vessel 20 (see FIGS. 7 & 13). The embodiment also includes a recirculating pump 96 and recycle piping 98 to return a portion of the water removed from separator vessel 20 through water outlet 30 to the radial eductor manifold 100, through the radial eductors 102, and back into the water layer 56. Recirculating pump 96 may be a centrifugal pump. Flow through the recycle piping 98 may be controlled by recycle valve 116.

As shown in FIGS. 8-11, each radial eductor 102 has an outer eductor shell 104 that provides stability and support. A tubular eductor stem 106 is oriented vertically within the eductor shell 104 and has a plurality of tangential exit slots 108 that extend from the top to approximately the midpoint of the eductor stem 106. The tangential exit slots 108 may be spaced at equal distances around the circumference of the eductor stem 106. The radial eductors 102 may be spaced around the radial eductor manifold 100 so that the flow from each eductor 102 is independent of and does not affect the flow from the other eductors 102. The radial eductors 102 may also be spaced so that they are separated from the interior wall of the separator vessel 20 by a distance of at least approximately 1.5 feet.

Figure 14:
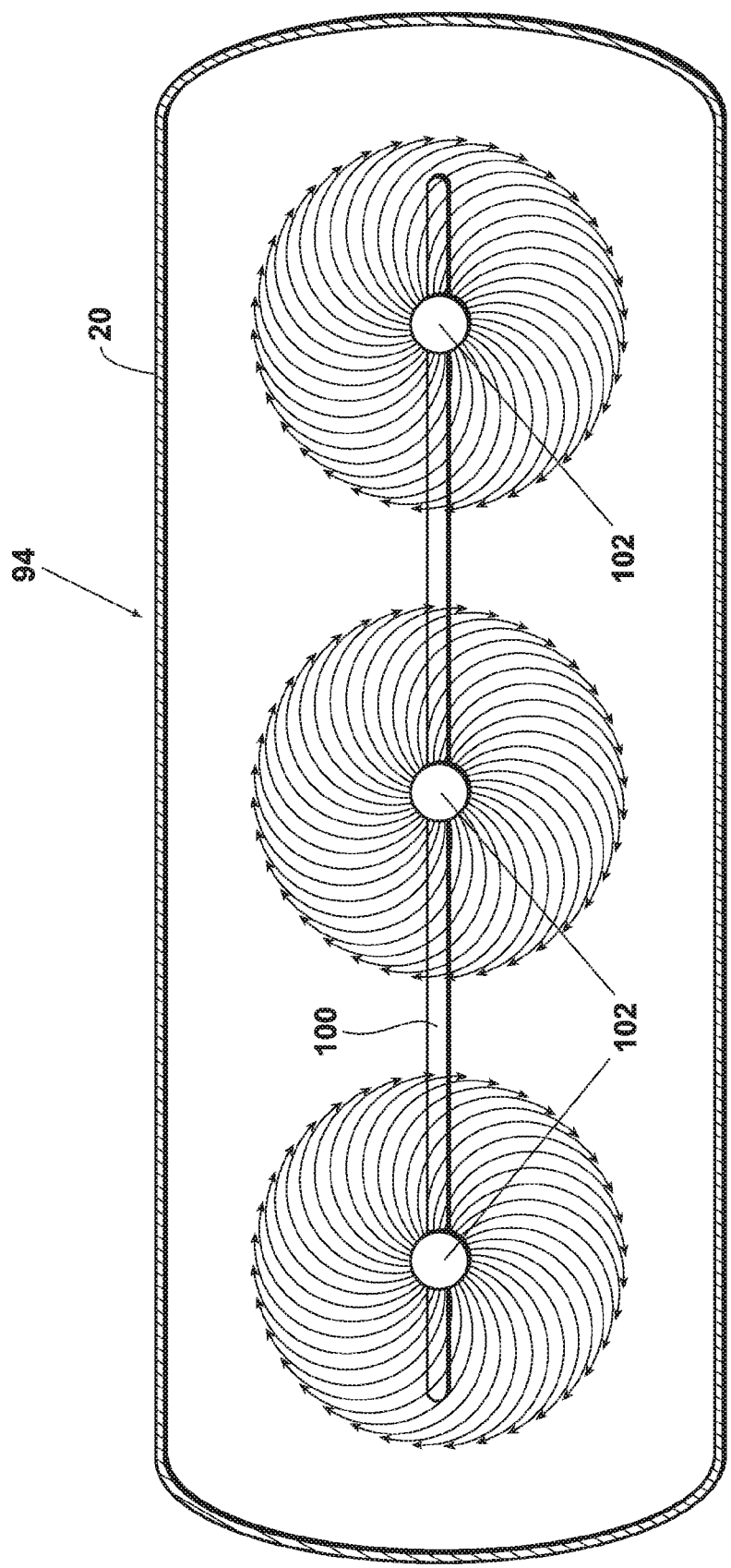
FIG. 14 illustrates the flow pattern of FIG. 13 from the top view of the water layer.

Water from the recycle piping 98 flows into each radial eductor 102 through the bottom of its inner bore 110, up through the exit slots 108, and leaves the radial eductor 102 through the exit portal 114 in the outer cap 112 of the radial eductor 102. The water passes through the radial eductor 102 at a low flow rate, which may be in the range of about 1 to 5 feet per minute (fpm). As shown in FIGS. 13-14, the tangential exit slots 108 of the radial eductors 102 cause the water to exit the radial eductors 102 in a swirling flow pattern around each eductor 102. This flow pattern gently agitates the lower surface of the interface emulsion layer 52, helping to break down the interface emulsion layer 52 and reducing its accumulation within the vessel 20. In an embodiment, the water flow rate through radial eductors 102 is increased until the interface emulsion layer 52 begins to upset. The water flow rate is then reduced until interface emulsion layer 52 begins to stabilize.

This disclosure may be susceptible to various modifications and alternative forms, and embodiment have been shown by way of example in the drawings and described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for" or "step for" performing a function, it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for controlling an interface emulsion layer within an oil treatment vessel, the method comprising:
    injecting a water flow from a brine water layer of the oil treatment vessel through a plurality of radial eductors arranged about a radial eductor manifold oriented in a horizontal plane and located in the brine water layer;
    wherein the water flow causes a swirling flow pattern of a volume of water in the brine water layer around each radial eductor, the swirling flow pattern agitating a lower surface of the interface emulsion layer residing above the brine water layer.

2. A method according to claim 1 further comprising of recycling a volume of water from the oil treatment vessel, wherein the water flow includes the recycled water.

3. A method according to claim 1 further comprising of adjusting a water flow rate in response to a level of the interface emulsion layer.

4. A method according to claim 3 wherein said adjusting causes the interface emulsion layer to destabilize.

5. A method according to claim 1 wherein the water flow through each radial eductor is in a range of 1 to 5 feet per minute.

6. A method according to claim 1 wherein the radial eductor manifold is located in a horizontal plane situated in an upper two-thirds portion of the volume of water.

7. A system for controlling an interface emulsion layer forming within an oil treatment vessel, the system comprising:
    a radial eductor manifold including a plurality of radial eductors and being located in a brine water layer residing within the oil treatment vessel;
    means for recycling a volume of the brine water layer to the radial eductor manifold;
    each radial eductor being oriented perpendicular to a center line of said radial eductor manifold and comprising an outer eductor shell and a tubular eductor stem with a plurality of tangential exit slots.

8. A system according to claim 7 wherein water flowing through the radial eductors creates a swirling flow pattern to agitate a lower surface of an interface emulsion layer residing between the brine water layer and an oil layer.

9. A system according to claim 7 wherein the means for recycling a volume of the brine water layer to the radial eductor manifold comprises a recirculating pump and recycle piping.

10. A system according to claim 7 wherein a water velocity through each radial eductor is in a range of 1 to 5 feet per minute.

* * * * *